April 14, 1970 P. A. THEATE 3,505,960
PROJECTILE FUSE AND PROJECTILES EQUIPPED WITH SAID FUSE
Filed March 25, 1968 6 Sheets-Sheet 1

INVENTOR.
P. A. Theate
BY
Richards & Geier
ATTORNEYS

April 14, 1970    P. A. THEATE    3,505,960
PROJECTILE FUSE AND PROJECTILES EQUIPPED WITH SAID FUSE
Filed March 25, 1968    6 Sheets-Sheet 2
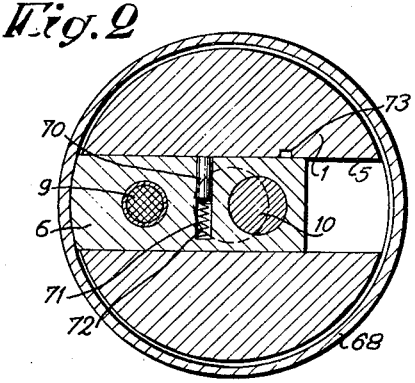
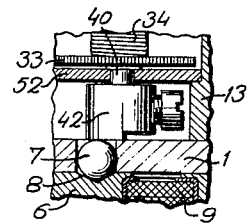
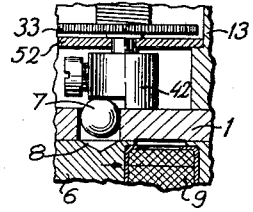
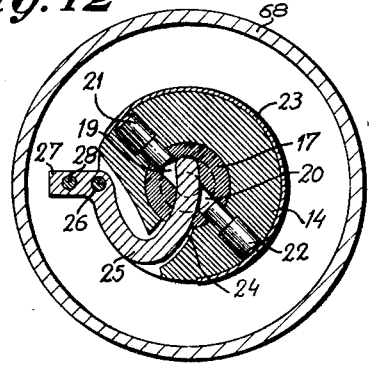
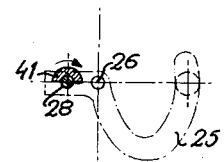
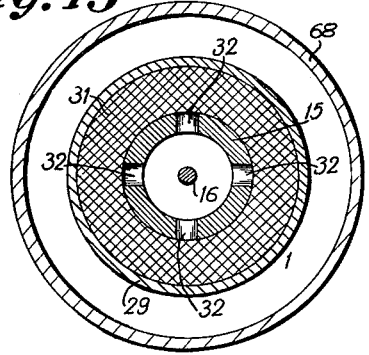
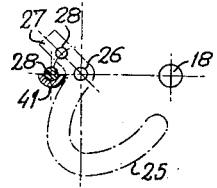
INVENTOR.
P. A. Theate
BY
Richards & Geier
ATTORNEYS April 14, 1970      P. A. THEATE      3,505,960
PROJECTILE FUSE AND PROJECTILES EQUIPPED WITH SAID FUSE
Filed March 25, 1968      6 Sheets-Sheet 3
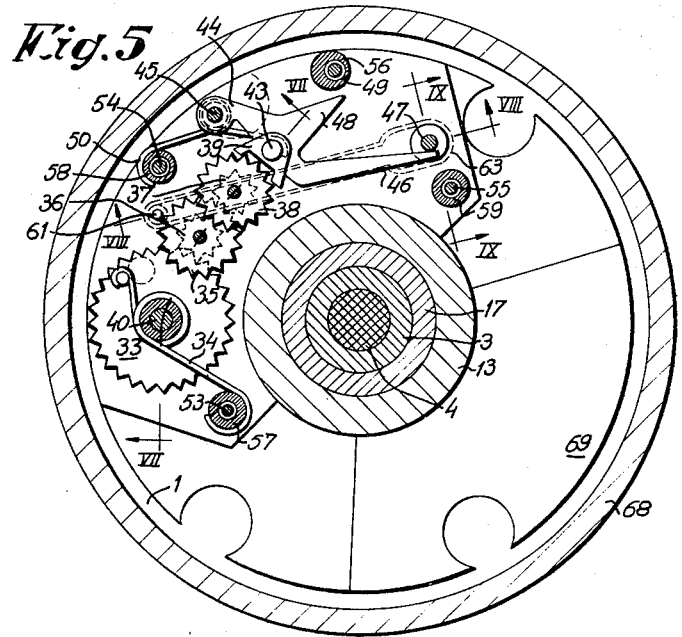
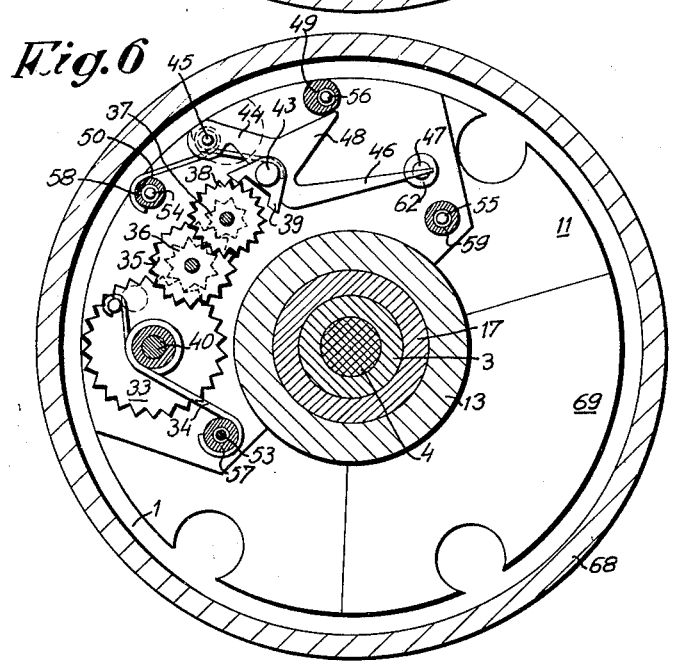
INVENTOR.
P. A. Theate
BY Richards & Geier
ATTORNEYS April 14, 1970     P. A. THEATE     3,505,960
PROJECTILE FUSE AND PROJECTILES EQUIPPED WITH SAID FUSE
Filed March 25, 1968     6 Sheets-Sheet 4

INVENTOR.
P. A. Theate
BY Richards & Geier
ATTORNEYS

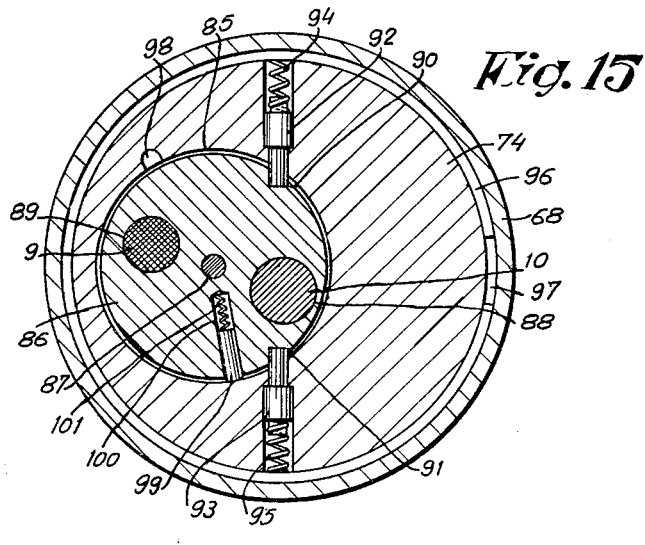
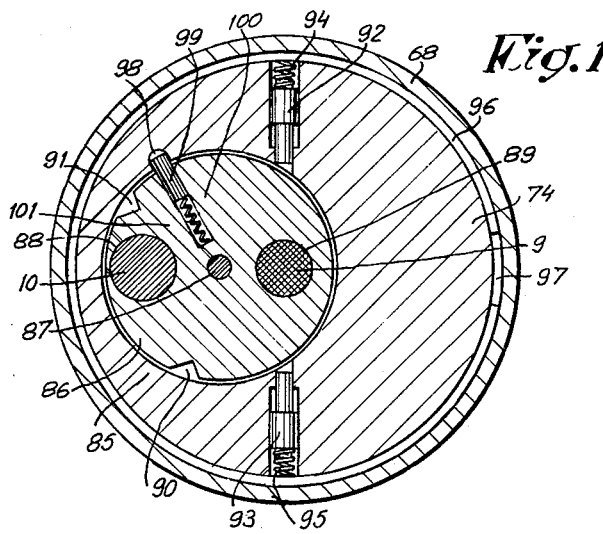

April 14, 1970     P. A. THEATE     3,505,960
PROJECTILE FUSE AND PROJECTILES EQUIPPED WITH SAID FUSE
Filed March 25, 1968     6 Sheets-Sheet 6
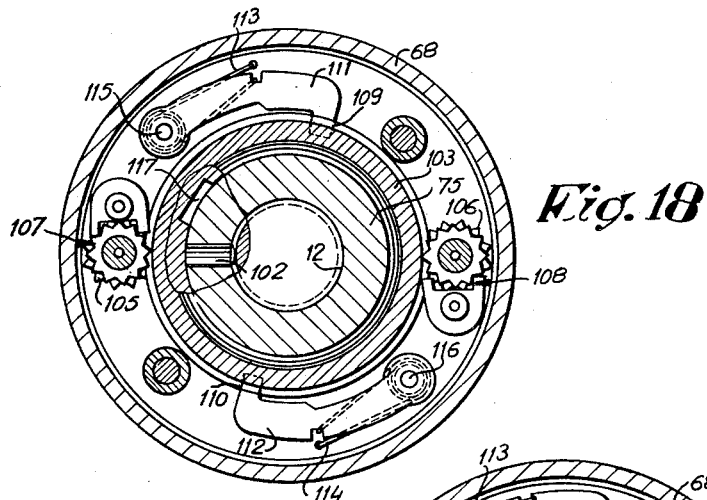
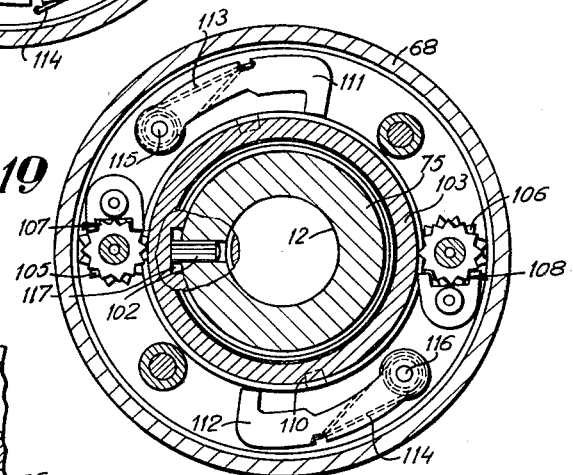
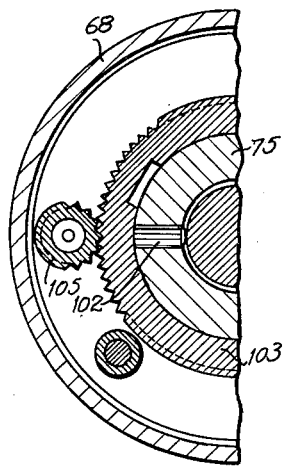
INVENTOR.
P. A. Theate
BY
Richards & Geier
ATTORNEYS

United States Patent Office 3,505,960
Patented Apr. 14, 1970

3,505,960
PROJECTILE FUSE AND PROJECTILES
EQUIPPED WITH SAID FUSE
Paul A. Theate, Liege, Belgium, assignor to Fabrique
Nationale d'Armes de Guerre, Societe Anonyme, a
company
Filed Mar. 25, 1968, Ser. No. 715,847
Claims priority, application Belgium, Mar. 31, 1967,
696,368; Mar. 5, 1968, 711,656
Int. Cl. F42c 15/22
U.S. Cl. 102—79
9 Claims

ABSTRACT OF THE DISCLOSURE

A projectile fuse comprises a primer-holder sliding in a housing, a locking device for same, retractable under the effect of a centrifugal force, a moving support carrying one element of the pyrotechnic train, means for securing the said support in waiting position and a means for securing the said support when the pyrotechnic element carried thereon is in alignment with the other elements of the pyrotechnic train.

This invention relates to a projectile fuse of the type rotating along its trajectory about its longitudinal axis such as, e.g. some rifle grenades.

The object of this invention is to provide a substantially complete safety against any undue firing of the explosive charge during handling and transport as well as when the projectile creeps in the launching tube and is at a predetermined distance therefrom.

These multiple safety means result from the combination of locking means and retarding means so that not only the firing of the explosive charge of the projectile may occur only when the projectile is brought into movement conditions resulting from the firing of the propelling charge, but also, when these conditions are met, the firing of the explosive charge may occur only after a predetermined time from the moment where the said conditions are met.

The conditions resulting from the firing of the propelling charge are concomitantly an energetic inertia effect resulting from the axial movement of the projectile and an effect resulting from the centrifugal force produced by the rotation of the projectile about its longitudinal axis.

These both movements, respectively these both simultaneous forces are releasing the locking and stopping devices so that the projectile is brought into condition for firing its explosive charge after a predetermined time from the firing of the propelling charge.

For this purpose, the fuse according to the invention is essentially characterized in that it comprises the combination of a primer-holder sliding in a housing and causing the percussion at the impact under the inertia effect, a locking device for the said primer-holder, which may be retracted under the effect of the centrifugal force, a moving support carrying one element of the pyrotechnic train, a means for securing the said support in waiting position and a means for securing the said support when the pyrotechnic element carried thereby is in alignment with the other elements of the pyrotechnic train.

The said moving support may be shifted by translation or by rotation.

An essential feature of the invention is the conditioning of the support carrying one element of the pyrotechnic train so that the latter is normally interrupted, but is automatically completed by the convenient shifting of the slide forming the support thereof when the conditions resulting from the firing of the propelling charge are reached.

Still other arrangements are characterizing the fuse according to the invention and the one and the other will be more apparent when reading the following detailed description of a non-limitative embodiment with reference to the enclosed drawings in which:

FIGURE 1 shown an axial section of the head of a projectile according to the invention;

FIGURE 2 is a section taken on the line II—II of FIGURE 1;

FIGURE 3 shows the portion indicated by the arrow $F_3$ in FIGURE 1;

FIGURE 4 is a view similar to FIGURE 3, the safety device being represented in retracted position;

FIGURE 5 is a section taken on the line V—V of FIGURE 1, the clockwork mechanism being represented in its blocked position;

FIGURE 6 is a view similar to FIGURE 5, the clockwork mechanism being represented after release;

FIGURE 10 is a section taken on the line X—X of FIGURE 1, the safety shutter being represested in active position;

FIGURE 11 is a view similar to FIGURE 10, the safety shutter being represented in retracted position;

FIGURES 12 and 13 are respectively sections taken on the lines XII—XII and XIII—XIII of FIGURE 1;

FIGURE 15 is a section taken on the line XV—XV of FIGURE 14 (as well as a section taken on the line XV—XV of FIGURE 17);

FIGURE 16 is similar to FIGURE 15, the double safety device being represented in a second characteristic position;

FIGURE 18 is a section taken on the line XVIII—XVIII of FIGURE 17;

FIGURE 19 is a view similar to FIGURE 18, the safety device being represented in a second characteristic position;

FIGURE 20 is a section taken on the line XX—XX of FIGURE 17.

Figure 1:
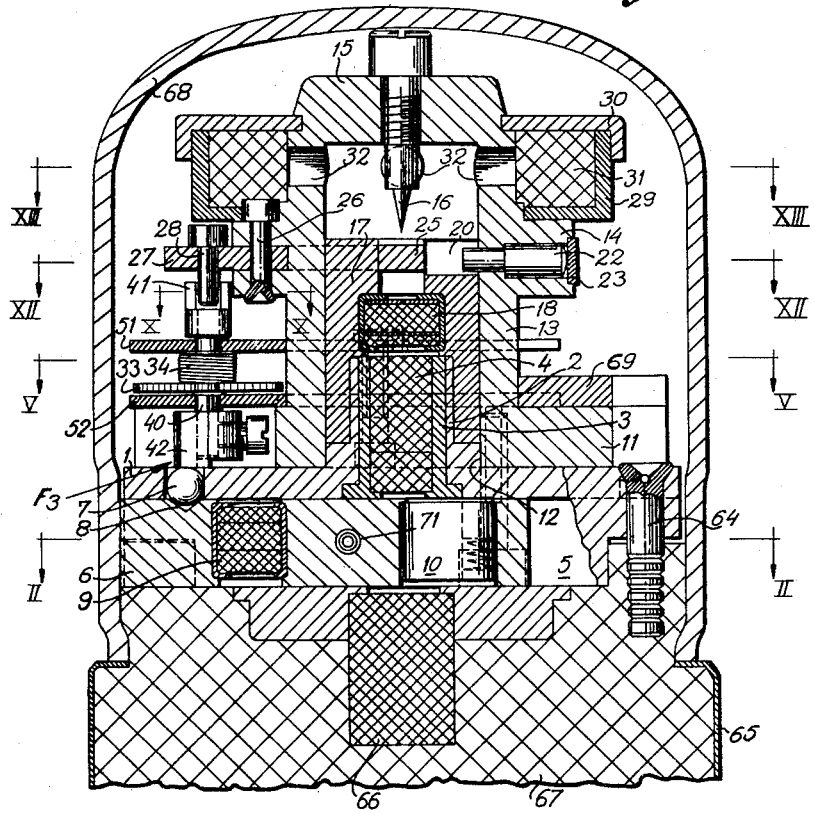
Figure 7:
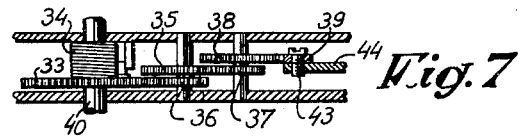
FIGURES 7, 8 and 9 are respectively sections taken on the lines VII—VII, VIII—VIII and IX—IX of FIGURE 5.
Figure 8:
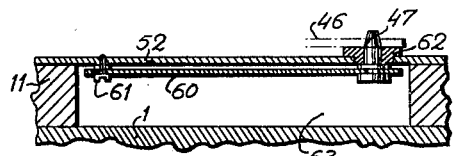
Figure 9:
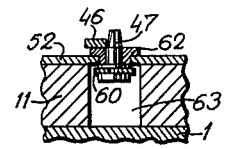

In the particular embodiment of a bouncing projectile according to FIGURES 1 to 13, the fuse has the following arrangement: the support comprises substantially a disc-shaped base 1 centrally provided with a hole overtopped with a hollow hub 2 engaged by an open bottom sleeve 3 forming the housing of a retarding charge 4. The underside of said support has a diametral groove 5 engaged with an easy fit by the slide 6 normally secured by a blocking ball 7 engaging a recess 8. The said slide 6, made, for example, from an aluminum alloy, has a sufficient thickness to form a convenient shield preventing the accidental firing of the explosive charge through the detonator. Said slide is provided so that its center of gravity lies on the side opposite to the housing of detonator 9 relative to the rotation axis of the projectile. For this purpose, said slide 6 comprises two housings, the one for the detonator 9 and the other receiving a material mass 10 the specific weight of which is substantially higher than the specific weight of the material forming the slide. In the described example, said mass 10 is made of a sintered heavy metal based on tungsten carbide. Upon the said support 1 is fastened in any suitable manner a chest comprising a base 11 which is also disc-shaped and the diameter of which is nearly the same as that of the said support 1. This base has a central hole 12 and is extended on one face by a tubular housing 13 having an intermediate external crown 14, the bottom 15 of the said housing being traversed by the stationary striker 16.

Into the said housing 13 is introduced with an easy fit the primer-holder 17 carrying the proper primer 18 which is thus interposed between the said retarding charge 4 and the said striker 16.

The upper edge of the said primer-holder 17 comprises two diametrally opposite grooves 19-20 engaged by the corresponding end of two locks 21-22 respectively, the other end of which rests upon one of the ends of a resilient strip 23 exerting upon the said locks an axial thrust sufficient to keep them normally in locking position.

The upper side of the said primer-holder 17 has a third curved notch 24 normally engaged by the curved arm of an oscillating shutter 25 mounted on a pivot 26 the axis of which is parallel with the longitudinal axis of the fuse. This shutter is extended beyond the said pivot 26 to form an appendix 27 one face of which carries a lug 28.

The said external crown 14 carries a casing 29 overtopped with a lid 30 defining a chamber receiving a bouncing charge 31, said chamber communicating with the inside of the said tubular housing 13 through diametral vents 32.

The base 11 carries the clockwork mechanism comprising the driving wheel 33, the driving spring 34, pinions 35, 36, 37 and the anchor escapement 38-39. The axis 40 of the said driving wheel 33 is extended upwardly and terminates by a half ring 41 disposed in front of the said lug 28 presented by the appendix 27 of shutter 25. The same axis 40 is extended downwardly and it terminates by a half ring 42 which, in one position, keeps the said blocking ball 7 in the recess 8 of the slide 6 and, in the other position, releases said blocking ball. Both half rings 41-42 are disposed so that they are simultaneously in their blocking position and simultaneously in retracted position after the rotation of the driving axis 40. The rotation angle will be selected in accordance with the safety time to be provided.

The anchor 39 of the escapement device is mounted on a pivot 43 secured on a lever 44 which is in turn mounted on a stationary pivot 45. The lever 44 has an arm 46 extended to contact a retractable stop 47. Said lever has a second arm 48 which, when the clockwork mechanism is operating, may contact an adjustable stop 49 providing the correct positioning of the anchor 39 with respect to its toothed wheel 38. This adjustable stop comprises the cam 49. The said lever 44 is provided with a radial safety means, namely the spring 50 which, in the absence of centrifugal force, blocks the anchor 39 in its toothed wheel 38.

The said clockwork mechanism is disposed between two small plates 51-52 the correct spacing of which is provided by tubular internally threaded inserts 57, 58, 59 and by a fourth tubular insert forming the said eccentric adjustable stop 49. The upper small plate 51 is secured through screws 53, 54, 55, 56 upon the said tubular inserts, whereas the lower small plate 52 is riveted upon the said inserts 57, 58, 59. As regards the whole assembly, it is secured upon the base 11 through screws (not shown) engaging the latter.

The retractable stop 47 comprises a small pin fastened at the end of a resilient blade 60 the other end of which is secured, e.g. through a screw 61, on the corresponding portion of the said small plate 52.

The said pin 47 passes also through an insert 62 fastened in a corresponding hole of the small plate 52 to provide the correct levelling of the lever 44, 46 during its oscillating movements, namely under the effects of the inertia force when the pin 47 is shifted axially. The said resilient blade 60 is housed in a hollow portion 63 of the base 11 the shape and the dimensions of which are such as to allow the free movements of the said resilient blade 60 and the pin 47 under the effects of the inertia force.

The so constituted fuse is fastened through its base 1, e.g. by means of rivets 64, on the proper projectile 65 in which the pyrotechnic train is completed by a relay 66 and the explosive charge 67. In addition, the said fuse is housed in the conical point 68 removably assembled with the said projectile 65.

The fuse may be equilibrated dynamically, e.g. by a weight 69 disposed diametrally opposite to the said clockwork mechanism.

It will be of course possible to introduce various modifications, as well as other devices, such as additional safety means. For instance, such additional safety means may consist of a lock 70 engaging with an easy fit a side blind hole 71 of the slide 6, together with a return spring 72, a notch or a blind hole 73 being provided in the base 1 so that the said slide 6 is locked in its position corresponding to the completion of the pyrotechnic train.

It will be noted that in this embodiment these safety conditions are provided during the handling and the transportation as well as when the projectile creeps in the launching tube and at a predetermined distance from the outlet of the latter. In fact, at rest, the safety conditions are provided by the rupture of the pyrotechnic train as well as by the different lockings so that it is quite impossible to birng the striker and the primer together whatever the stresses resulting from accidental causes and namely from violent falls may be. The unlocking of the primer-holder and the completion of the pyrotechnic train require necessarily and simultaneously the stresses corresponding to the inertia force coming from the firing of the propelling charge and the centrifugal force resulting from the rotation of the projectile about its axis in the launching tube.

It is difficult to conceive accidental causes meeting simultaneously said both conditions.

On the other hand, these conditions being reached due to the rotation of the projectile through the launching tube, a substantial margin for safety is still available owing to the escapement clockwork mechanism; the operating conditions and duration may be predetermined accurately so that the unlocking of the primer-holder occurs only with a duly controlled delay. In this way, total safety conditions are provided not only in the launching tube, but also at a reasonable distance therefrom.

It will also be observed that the clockwork mechanism may be actuated only provided that the fuse is brought in the conditions resulting from the firing of the propelling charge of the projectile.

In fact, at this time, under the effect of the centrifugal force, the resilient strip 23 opens, being thereby capable of freeing the locks 21-22 which are released from the primer-holder 17. Simultaneously, under the inertia effect, the stop 47 is retracted against the action of its return spring 60, thereby releasing the lever 44 which, under the effect of the centrifugal force, is shifted against the action of the return spring 50 until its arm 48 abuts are adjustable stop 49. At this time, the clockwork mechanism is released, the escapement device 38, 39 functioning then normally.

The driving axis 40 is rotating in given conditions and at a given speed. When it will have completed a predetermined angular shifting, it will have released the shutter 25 and the slide 6. Under the effect of the centrifugal force, the said shutter 25 is completely released from the primer-holder 17 whereas, under the same effect of the centrifugal force and owing to the presence of the weight 10, the slide 6 is shifted so that the detonator 9 forming the additional element of the pyrotechnic train comes in a coaxial position with respect to the retarding charge 4 and the relay 66. Then the slide 6 is locked by the introduction of the lock 70 into the notch 73 under the effect of the spring 72. In addition, the primer-holder 17 is completely released and the pyrotechnic train is provided so that, at the impact, the primer 18 will be conventionally thrown against the striker 16.

In the described and illustrated embodiment, the firing of the explosive charge 67 will be delayed by the retarding charge 4. The bouncing charge 31 will be fired during this delay, thereby compressing sufficiently the inside of the conical point 68 to eject the explosive body before the explosive charge 67 is fired via the retarding charge 4, the detonator 9 and the relay 66.

It is of course apparent that this type of fuse is valuable for any projectile equipped or not equipped with a bouncing charge. When the projectile is not provided with a bouncing charge, the explosive charge 67 is fired without any delay due to the detonator 9 via the relay 66.

Figure 17:
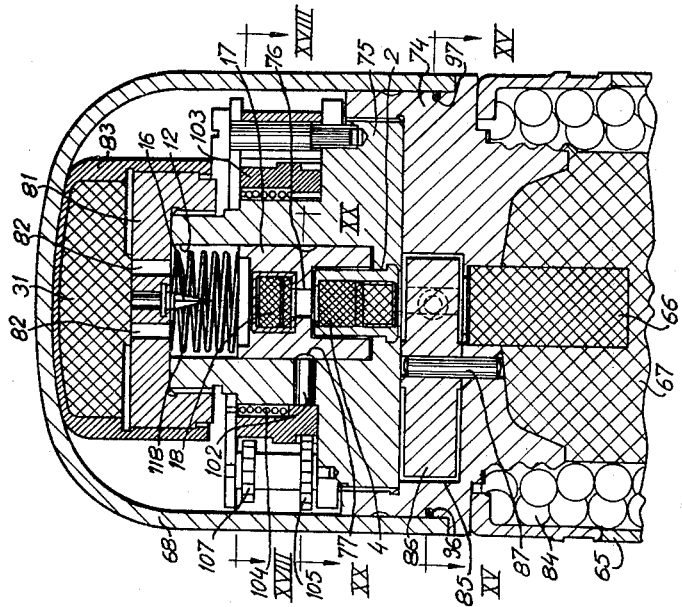
FIGURE 17 is an axial section of the head of a projectile according to another embodiment of the arrangement of FIGURE 14.
Figure 14:
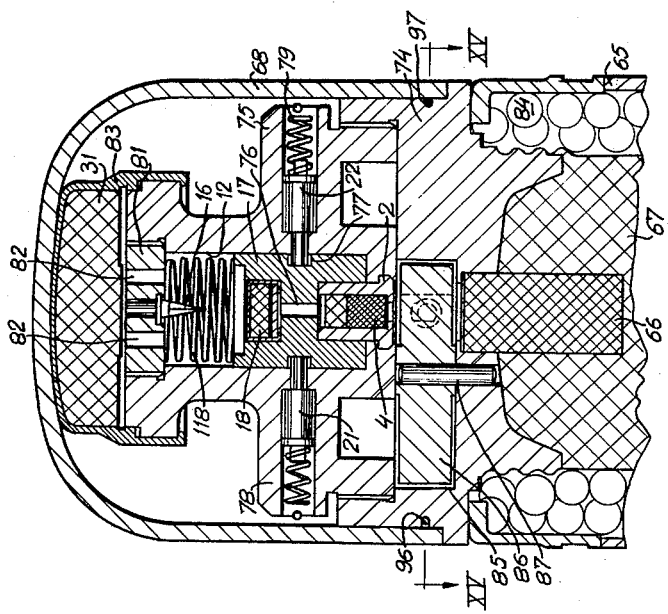
FIGURE 14 is an avial section of the head of a projectile according to the present improvements.

Of course, any modification and any other additional element may be introduced in this embodiment by adapting more particularly the shape and the dimensions of the supporting elements and the fastening means in accordance with the ammunition or the projectiles being equipped. It will be also possible to substantially simplify the fuse as shown in the examples of FIGURES 14 to 20. In fact, in the embodiment of FIGURES 14, 15 and 16, the simplified device comprises the following features: Upon a base 74 upwardly arranged as a cup is fastened, e.g. by screwing, a head 75 replacing the bases 1 and 11, the tubular housing 13 and the intermediate crown 14.

The central passage 12 has also engaged therein with an easy fit the primer-holder 17 carrying the primer 18 and overlying the retarding charge 4 housed in the open bottom retarder-holder 2. Between the primer 18 and the retarding charge 4, is provided a communication formed by an axial channel 76 traversing the corresponding portion of the primer-holder 17. The latter has, at its half height, a peripheral groove 77 normally engaged by the locks 21-22 actuated in their interlocking position by the springs 78-79 respectively. The head 75 is provided upwardly with a disc 81 in the center of which is fastened the striker 16, said disc being traversed by openings 82 leading to the bouncing charge 31 enclosed by a cap 83 fastened on the upper portion of the said head 75. The assembly of the elements just described is covered by the conical point 68 fastened upon the said base 74 by any suitable means, said base overtopping the proper projectile 65 containing the explosive charge 67 with its relay 66 and, if desired, a charge of balls 84 or any other fragmentation system. The said base 74 has a cylindrical housing 85 in which is adapted with an easy fit a rotating disc 86 forming a rotating runner mounted on an axis 87 the lower end of which engages the said basis 74. On both sides of the said axis 87, the rotating runner 86 is traversed by two holes 88, 89. The second hole 89 contains the detonator 9 and the first hole is filled with a material 10 the mass of which is greater than that of the said detonator.

The periphery of the rotating runner 86 has two notches 90, 91 engaged respectively by the locks 92, 93 actuated towards this engagement position by their respective springs 94, 95 leaning upon a segment 96 engaging a peripheral groove 97 of the said base 74. The said notches 90, 91 and the said locks 92, 93 respectively are located diametrically opposite the base 74. The outlining wall of the housing 85 has a notch 98 which is to be engaged by a lock 99 adapted with an easy fit in a diametral channel 100 of the rotating runner 86 permanently actuated outwardly by a thrust spring 101.

Thus, in this rest or waiting position represented in FIGURE 15, the moving elements of the fuse are secured and protected against any dangerous stress. In fact, the primer-holder 17 is secured by the locks 21, 22 and the rotating runner 86 is secured by the locks 92, 93, thereby interrupting the pyrotechnic train by maintaining the detonator 89 outside the projectile axis. At the departure of the projectile and as soon as the latter has left the gun, owing to the effects of the centrifugal force, the locks 21, 22 are freed, thereby releasing the primer-holder 17 which is nevertheless kept spaced from the stationary striker 16 by a small spring 118 provided to prevent the well-known creeping phenomenon. At the same time, the locks 92, 93 have released the rotating runner 86 which, owing to the centrifugal force, is rotating about its axis 87, thereby bringing the detonator 9 into alignment with the primer 18 of the retarding charge 4 and the relay 66, thereby completing the pyrotechnic train. The said rotating runner 86 is blocked in this position by the engagement of its lock 99 into the notch 98.

The embodiment of FIGURES 17 to 20 is similar to that just described, except as regards the device having simple locks 21, 22, said device being replaced by an escapement mechanism. Effectively, the safety mechanism of the primer-holder 17 comprises a single lock 102 permanently contacting the internal face of an external toothed crown 103 forming a drum.

The latter is actuated by a helical spring 104. The said toothed crown is engaged by at least one sprocket such as the sprocket 105, combined with an escapement device 107. In the represented embodiment, a second sprocket 106 disposed symmetrically with respect to the projectile axis is combined with a second escapement device 108. The said drum has externally two notches 109, 110 which may be engaged by locks 111, 112 respectively actuated towards their engagement position through return springs 113, 114 respectively, said locks being capable of oscillating about an axis 115, 116 respectively leaning upon the head 75. On its internal face, the said drum has also a notch 117 which may be engaged by the said lock 102 under the effect of the centrifugal force.

In rest or waiting position, the locks 111, 112 are securing the drum 103 against the stresses of spring 104. When the rotation of the projectile induces the firing, the said locks are released and the drum is rotated controllably through the escapement devices 105, 107 and 106, 108. After a predetermined time, the groove 109 comes in front of lock 102 which, under the effect of the centrifugal force, releases the primer-holder 17. However, owing to the anti-creeping system, the latter is kept spaced from the striker 16 until the impact of the projectile against an obstacle. The rotating runner 87 is operating in the manner indicated in the preceding embodiment.

Of course, any other simplified embodiment may be provided, namely by adopting any other element or mechanism which may be actuated either by the inertia effect or by the effects of the centrifugal force.

The invention covers any modifications provided that these modifications form technical combinations equivalent to those just described.

The invention covers also, as a novel industrial product, any fuse including the essential features disclosed by the present specifications as well as the ammunition and the projectiles equipped with such fuse.

What I claim is:

1. A fuse for projectiles of the type rotating along their trajectory about their longitudinal axis, said fuse comprising a housing, a primer-holder sliding in said housing and providing percussion at the impact under the effect of inertia, said primer-holder having a peripheral recess, at least one diametral lock engaging said recess, a toothed drum-shaped crown engaged by said lock, a system of escapement toothed wheels engaged by said crown, a helical spring rotating said crown, locks securing said spring and adapted to be retracted by action of centrifugal force after the propelling charge of the projectile is fired, a plurality of elements of a pyrotechnic train, a moving support carrying one element of the pyrotechnic train, means securing said support in a waiting position, and means securing said support when the pyrotechnic element carried thereon is in alignment with the other elements of the pyrotechnic train.

2. A fuse according to claim 1, characterized in that the locks may each oscillate about an axis and they are actuated towards their engagement position through a thrust spring, the curved ends of said locks being in a diametral opposite position.

3. A fuse according to claim 1, characterized in that the crown arranged as a drum has, upon its internal face, a notch which may be engaged by the lock of the primer-holder when the said lock is actuated under the effects of the centrifugal force and when the drum has effected the prescribed rotation.

4. A fuse for projectiles of the type rotating along their trajectory about their longitudinal axis, said fuse comprising a housing, a primer-holder sliding in said housing and providing percussion at the impact under the effect of inertia, a locking device securing said primer-holder, said locking device being retractable through the centrifugal force generated after the firing of the propelling charge of the projectile and having a shutter securing the primer-holder, a pivot carrying said shutter, the axis of said pivot being parallel to the longitudinal axis of the fuse, an element of the pyrotechnic train, a slide carrying said element of the pyrotechnic train and being shiftable transversely, a clockwork mechanism blocking said slide, said clockwork mechanism being adapted to release said slide after a predetermined time period, and a stop blocking said clockwork mechanism and retractable under the effect of inertia when the firing occurs.

5. A fuse according to claim 4, characterized in that the shutter securing the primer-holder is curved.

6. A fuse according to claim 4, characterized in that the shutter securing the primer-holder is extended beyond its pivot by an appendix cooperating with the axis of the driving wheel of the clockwork mechanism for blocking or releasing the said shutter.

7. A fuse according to claim 6, charcaterized in that the appendix extending the shutter beyond its pivot carries a lug, whereas the extended axis of the driving wheel of the clockwork mechanism has, at one end, a half ring blocking the said lug in one position and releasing it in a second position reached by a rotation of a predetermined angle in accordance with the intended safety time.

8. A fuse for projectiles of the type rotating along their trajectory about their longitudinal axis, said fuse comprising a housing, a primer-holder sliding in said housing and providing percussion at the impact under the effect of inertia, a locking device securing said primer-holder, said locking device being retractable through the centrifugal force generated after the firing of the propelling charge of the projectile, an element of the pyrotechnic train, a slide carrying said element of the pyrotechnic train and being shiftable transversely, a clockwork mechanism blocking said slide, said clockwork mechanism comprising an anchor escapement device having an anchor pivot, an oscillating lever, said anchor pivot being mounted on said lever and a stop retractable under the effect of the inertia force when the propelling charge of the projectile is fired, said oscillating lever normally contacting said stop, said stop comprising a stud and a resilient blade having an end connected to said stud, whereby the stud is permanently actuated to its active position.

9. A fuse according to claim 8, characterized in that the primer-holder is engaged by two diametrally opposite locks maintained in locking position by a resilient strip which may be distorted under the effect of the centrifugal force after the propelling charge of the projectile has been fired, thereby releasing the said locks.

References Cited

UNITED STATES PATENTS

| | | | |
|---|---|---|---|
| 896,135 | 8/1908 | Meigs et al. | 102—82 |
| 1,014,183 | 1/1912 | Schneider | 102—80 |
| 1,216,802 | 2/1917 | Hawkins | 102—79 |
| 1,382,750 | 6/1921 | Sprague et al. | 102—7.2 |
| 1,791,716 | 2/1931 | Davis et al. | 102—7.2 X |
| 2,960,037 | 11/1960 | Raech et al. | 102—76 |
| 3,148,621 | 9/1964 | Varaud | 102—80 X |
| 3,326,131 | 6/1967 | Hazelet | 102—79 |
| 3,334,589 | 8/1967 | Simmen | 102—79 X |
| 3,347,166 | 10/1967 | Simmen | 102—84 |

SAMUEL FEINBERG, Primary Examiner

C. T. JORDAN, Assistant Examiner

U.S. Cl. X.R.

102—84